P. J. JOECKEN.
VIBRATOR.
APPLICATION FILED JUNE 18, 1914.
1,174,869.
Patented Mar. 7, 1916.
2 SHEETS—SHEET 2.
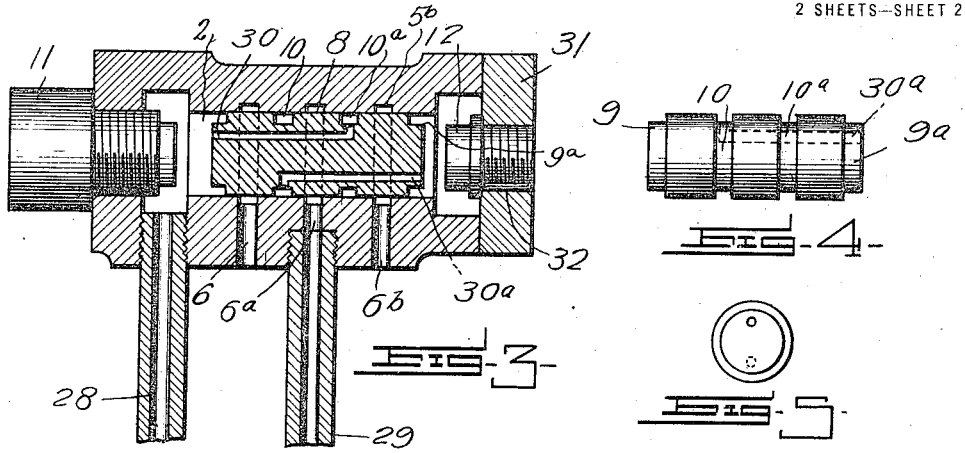
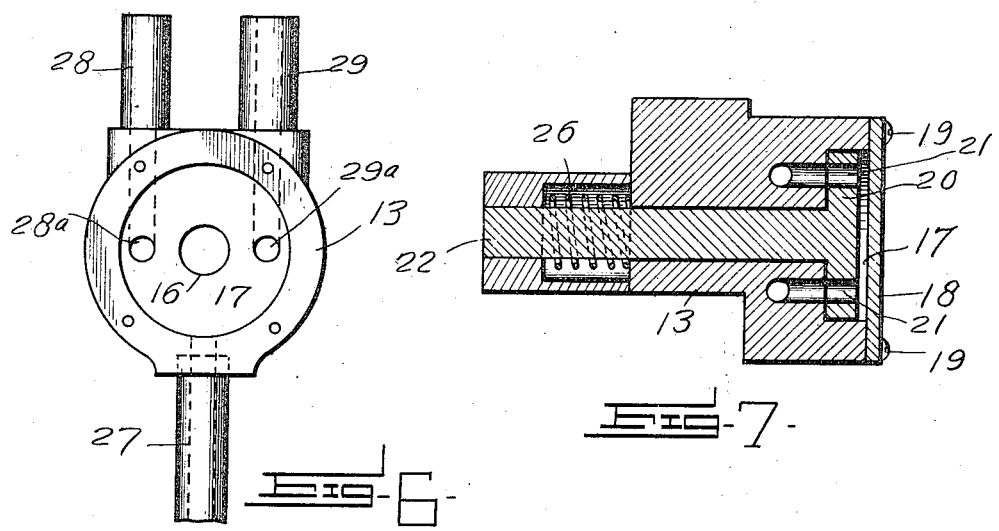
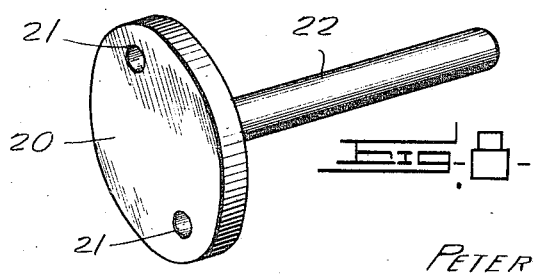
Inventor
PETER J. JOECKEN,
Witnesses
By
Attorney

UNITED STATES PATENT OFFICE.

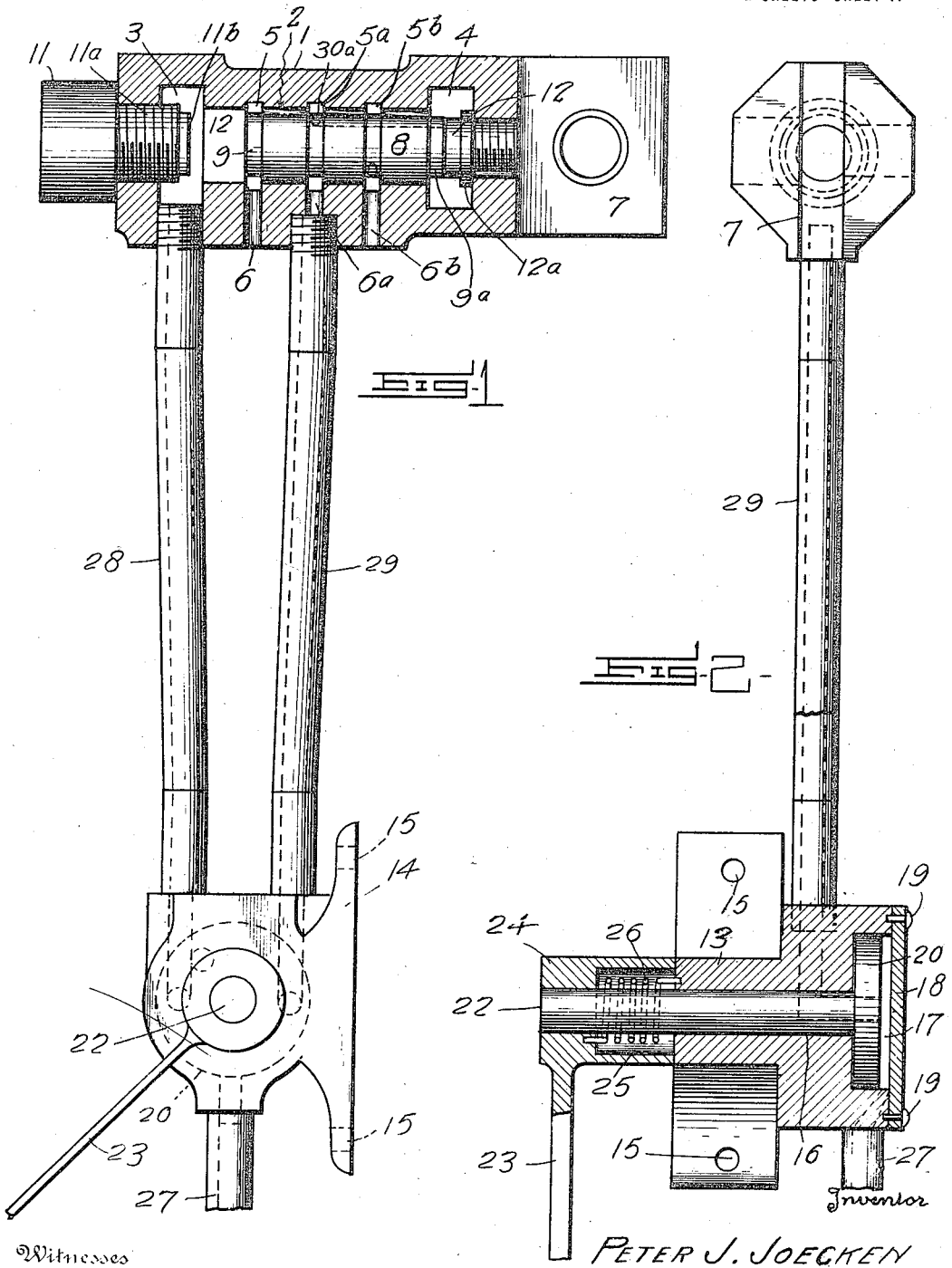

PETER J. JOECKEN, OF CLEVELAND, OHIO.

VIBRATOR.

1,174,869.  Specification of Letters Patent.  Patented Mar. 7, 1916.

Application filed June 18, 1914. Serial No. 845,847.

*To all whom it may concern:*

Be it known that I, PETER J. JOECKEN, a citizen of the United States, and a resident of Cleveland, in the county of Cuyahoga and State of Ohio, have made certain new and useful Improvements in Vibrators, of which the following is a specification.

My invention is an improvement in vibrators, and has for its object to provide a device of the character specified, operating by fluid under pressure, and wherein a cylinder is provided, and a piston in the cylinder, and wherein valve mechanism is provided in connection with the cylinder for operating the piston, to positively force the same in opposite directions.

In the drawings: Figure 1 is a side view of the improvement with the cylinder in section, Fig. 2 is a top plan view with the valve controlling mechanism in section, Fig. 3 is a longitudinal section of the cylinder, Fig. 4 is a top plan view of the piston, Fig. 5 is an end view of the same, Fig. 6 is a front view of the valve controlling mechanism with the head removed, Fig. 7 is a longitudinal section of the same at right angles to Fig. 2, and Fig. 8 is a perspective view of the controlling valve.

The present embodiment of the invention comprises a cylinder 1, having a central bore 2, which communicates at its ends with enlargements 3 and 4, and the bore of the cylinder is provided with three internal grooves 5—5$^a$ and 5$^b$ respectively, each of which is provided with a radial port 6—6$^a$ and 6$^b$ respectively.

A clamp 7 is provided at one end of the cylinder to permit the vibrator to be connected to the pattern plate in the mold, and the piston 8 is arranged within the cylinder, fitting the same, and the ends of the piston are reduced annularly, as indicated at 9 and 9$^a$. The piston is also provided with two annular grooves 10 and 10$^a$ intermediate its ends. The grooves 10 and 10$^a$ and the reduced portions 9 and 9$^a$ are spaced apart a distance corresponding to the spacing of the grooves 5—5$^a$ and 5$^b$, and cylinder heads 11 and 12 are threaded into the ends of the cylinder. The head 11 is provided with a reduced threaded portion 11$^a$, which passes through a threaded opening in the adjacent end of the cylinder, and the shoulder formed between the reduced portion and the body engages the outer face of the end of the cylinder. The head 11 is also provided with another plain reduced portion 11$^b$ at its inner end, and the head 12 is provided with an annular rib 12$^a$ intermediate the plain portion and the threaded portion, and the plain portion of the head is within the enlargement 4, the rib 12$^a$ engaging the inner face of the end of the cylinder.

The mechanism for controlling the admission of fluid under pressure to the cylinder is a casing 13 having a base 14, provided with openings 15 for permitting the casing to be secured to a fixed support, and the casing is provided with a longitudinally extending opening 16, and at one end the opening is counterbored or enlarged, as shown at 17. A head 18 is secured to the said end of the cylinder, by means of screw bolts 19 or the like, and a disk valve 20 is arranged within the counterbore or enlargement, the said valve having oppositely arranged transverse openings or ports 21. The disk valve is also provided with an axial stem 22, which extends beyond the opposite end of the casing, and an operating lever 23 is secured to the said end, the lever having a hub or bearing 24 for receiving the stem. The inner end of the bearing is chambered, as shown at 25, and a coil spring 26 is arranged within the chambered portion, encircling the stem, and connected at one end to the casing and at the other to the hub. The casing is provided with an inlet pipe 27, and with supply pipes 28 and 29 respectively. The pipes 28 and 29 are connected to the cylinder at the enlargement 3, and at the port 6$^a$ respectively, and the said pipes open into the counterbored portion 17 of the casing, by means of ports 28$^a$ and 29$^a$ respectively.

The operation of the improved vibrator is as follows: When the cylinder is attached to the pattern plate by means of the clamp 7, and the handle 23 is manipulated to turn the valve 20, the piston will be reciprocated. The ports 21 of the valve 20 are designed to register with the ports 28$^a$ and 29$^a$ of the casing, to connect the said ports with the source of supply 27. The molder operates the lever 23 with his knee, and the spring 26 acts normally to hold the valve in closed position. The base 14 is connected to the molding machine, by screws or the like which are passed through the openings 15. The ports 21 are not arranged diametrically of the disk, and they cannot register simultaneously with the ports 28ª and 29ª but in alternation. When the valve is moved to connect the port 28ª with the supply of fluid under pressure by way of the pipe 27, the fluid under pressure is admitted through the pipe 28 to the enlargement 3 of the cylinder, and the piston is driven to the right of Fig. 1, as shown, engaging the head or bumper 12 of the vibrator. When the piston reaches the end of its stroke the port 6 is open, the reduced end 9 of the piston being at the port, and the fluid under pressure escapes. The piston 8 is provided with channels 30 and 30ª leading from the respective ends thereof and opening laterally at the annular grooves 10 and 10ª respectively. When the piston is in the position of Fig. 1, not only is the end adjacent to the head or bumper 11 in communication with the atmosphere by way of the port 6, but also by way of the channel 30ª and the port 6ᵇ. When the lever 23 is moved to bring one of the ports 21 in registry with the port 29ª the fluid under pressure passes by way of these ports and the pipe 29 to the port 6ª, and by way of the groove 5ª and the channel 30 to the enlargement 4 of the cylinder, and the piston is driven in the opposite direction, contacting with the bumper 11. When the piston reaches the end of its travel toward the left of Fig. 1, the reduced portion 9ª is at the port 6ᵇ and the end 4 of the cylinder is connected with the atmosphere by way of the said port, and by way of the channel 30, the groove 5 and the port 6. Thus a repetition of these movements of the valve 20 will alternately connect the ends of the cylinder with the source of fluid under pressure and the piston will be operated to alternately engage the bumpers 11 and 12, to vibrate the pattern plate in the mold. Whenever the lever 23 is released the spring 26 returns it to normal position, as shown in Fig. 1.

In Fig. 3 the clamp 7 is omitted, the ends of the cylinder being closed by a head 31, having an internally threaded opening 32 for receiving the bumper 12. Fig. 3 also shows the piston repelled from the bumper 12 and in a position to cover port 6ª, so as not to admit air into channel 30 or 30ª, consequently no reciprocating motion of the piston. For the purpose of sending the piston to bumper 12 (before opening port 29ª in valve casing) port 28ª is opened, to let air through the pipe 28 between bumper 11 and piston 8. Port 28ª is closed, before port 29ª is opened to admit air to port 6ª for the purpose of vibrating the piston 8. This will explain why the port 28ª and pipe 28 leading into the enlarged space 3 is necessary to insure a sure vibrating motion of piston 8. Without this the vibrator is worthless.

With the parts in the position of Fig. 1, the motive fluid enters the controlling valve casing from the pipe 27 and passes into the pipe 29 which at this time is in register with one of the ports 21 of the valve. The motive fluid enters the cylinder 1 by way of the port 6ª, and passes around the groove 5ª to the opening of the passage 30ª, and passes by way of this passage to the enlargement or chamber 4 of the cylinder. The motive fluid acting on the piston drives it in the opposite direction causing the piston to strike the stop or bumper 11ᵇ. As the piston reaches the bumper or stop 11ᵇ, the end 9ª of the piston passes the port 6ᵇ, permitting the motive fluid to pass by way of this port. At the same time the inner end of the passage 30 registers with the groove 5, and the motive fluid may also pass through the exhaust port 6. At the same time the inner end of the passage 30 registers with the port 6ª, and the motive fluid from the pipe 29 passes by way of the port 6ª, and the passage 30 to the chamber 3, and the piston is immediately driven in the opposite direction, contacting with the stop 12. When this occurs the motive fluid in the chamber 3 may exhaust by way of the passage 30 and the port 6ᵇ, and also by way of the groove 5 and the passage 6. As long as the motive fluid is admitted to the pipe 29 this reciprocation will continue. Were no means provided for preventing the same the piston would invariably take an intermediate position out of contact with either stop 11ᵇ or 12 when the pipes 27 and 29 were disconnected. In this position of the piston the port 6ª would be out of register with the passages 30 and 30ª, and it would be necessary to disconnect the parts to return the piston to one end or the other in order that it might be again brought into operation. This state of affairs is prevented by providing means for placing the piston in such position that one of the passages 30 or 30ª will register with the port 6ª. This is brought about by swinging the valve 20 to connect the pipe 27 with the pipe 28. The motive fluid now passes by way of the pipe 28 to the chamber 3, driving the piston toward the stop 12ª. When now the valve 20 is moved to close the pipe 28 and open the pipe 29 the piston will again commence its reciprocating motion. The arrangement of the pipe 28 is especially designed to eliminate stopping of the piston on the dead center.

I claim:

1. A vibrator, comprising a cylinder for attachment to a pattern, and a piston mounted to vibrate within the cylinder, the cylinder having an inlet port intermediate its ends and an exhaust port near each end and arranged to be uncovered by the piston as it strikes the opposite ends of the cylinder, the piston being ported to connect the inlet port with each end of the cylinder, as the piston strikes the said end and to connect the opposite end of the cylinder to the exhaust port remote from the said end, the cylinder having an auxiliary inlet port at one end, a controlling valve for controlling the admission of the motive fluid to the cylinder, and having outlet ports connected to and communicating with the inlet ports of the cylinder, and having an inlet port for connection with a source of supply, a valve in the casing having means for alternately connecting the outlet ports with the inlet port, a lever connected with the valve for moving the same to open position, and a spring normally holding the valve closed.

2. A vibrator, comprising a cylinder for attachment to a pattern, and a piston mounted to vibrate within the cylinder, the cylinder having an inlet port intermediate its ends and an exhaust port near each end and arranged to be uncovered by the piston as it strikes the opposite end of the cylinder, the piston being ported to connect the inlet port with each end of the cylinder as the piston strikes the said end and to connect the opposite end of the cylinder to the exhaust port remote from the said end, the cylinder having an auxiliary inlet port at one end, a controlling valve for controlling the admission of the motive fluid to the cylinder, and having outlet ports connected to and communicating with the inlet ports of the cylinder, and having an inlet port for connection with a source of supply, and a valve in the casing having means for alternately connecting the outlet ports with the inlet port.

3. A vibrator comprising a cylinder for attachment to a pattern, and a piston mounted to vibrate within the cylinder, the cylinder having an inlet port intermediate its ends and an exhaust port near each end and arranged to be uncovered by the piston as it strikes the opposite end of the cylinder, the piston being ported to connect the inlet port with each end of the cylinder as the piston strikes the said end and to connect the opposite end of the cylinder to the exhaust port remote from the said end, the cylinder having an auxiliary inlet port at one end, and a controlling valve for controlling the admission of the motive fluid to the cylinder.

4. A vibrator, comprising a cylinder for attachment to a pattern, and a piston mounted to vibrate within the cylinder, the cylinder having an inlet port intermediate its ends and an exhaust port near each end and arranged to be uncovered by the piston as it strikes the opposite end of the cylinder, the piston being ported to connect the inlet port with each end of the cylinder as the piston strikes the said end and to connect the opposite end of the cylinder to the exhaust port remote from the said end, the cylinder having an auxiliary inlet port at one end.

5. A vibrator, comprising a cylinder for attachment to a pattern, and a piston mounted to vibrate within the cylinder, the cylinder having an inlet port intermediate its ends and an exhaust port near each end and arranged to be uncovered by the piston as it strikes the opposite end of the cylinder, the piston being ported to connect the inlet port with each end of the cylinder as the piston strikes the said end and to connect the opposite end of the cylinder to the exhaust port remote from the said opposite end.

6. A vibrator, comprising a cylinder having its ends annularly enlarged to form chambers at the ends thereof, and having an inlet port intermediate its ends and an exhaust port between each chamber and the inlet port, said cylinder having an inlet port at one of the chambers, a piston mounted to reciprocate in the cylinder, the cylinder having stops for engagement by the ends of the piston at each end thereof and extending into the adjacent chamber, said piston being ported to connect the first named inlet port with the chamber adjacent to the advanced end of the piston, and to connect the opposite end of the cylinder to the exhaust, and a controlling valve for controlling the admission of the motive fluid to either inlet port.

7. A vibrator, comprising a cylinder, a piston within the cylinder, said cylinder having a central inlet port, and an annular internal groove at the port, and having an enlargement at each end of the cylinder, the piston being ported to connect the inlet port groove to that end of the cylinder adjacent to the advanced end of the piston, said cylinder having a second inlet port at one end and communicating with the adjacent enlargements, and a controlling valve for admitting motive fluid to either inlet port.

8. A vibrator, comprising a cylinder having means for connecting the same to the object to be vibrated, a piston within the cylinder, said cylinder having an inlet port intermediate its ends, and having an enlargement at each end of the cylinder, the piston being ported to connect the inlet port to that end of the cylinder at which the piston is when the ports thereof are in register with the inlet port, said cylinder having a second inlet port at one end and communicating with the enlargement, a controlling valve for connecting the inlet ports to a source of fluid under pressure, said valve comprising a casing having an inlet port for connection with the source, and having outlet ports connected with the inlet ports of the cylinder, a valve in the casing, and having passages for alternately connecting the inlet port with the outlet ports, a spring acting normally to move the valve out of register with either port, said valve being manually operated to move it in the opposite direction.

9. A vibrator, comprising a cylinder having means for connecting the same to the object to be vibrated, a piston within the cylinder, said cylinder having an inlet port intermediate its ends and having an enlargement at each end of the cylinder, the piston being ported to connect the inlet port to that end of the cylinder at which the piston is when the ports thereof are in register with the inlet port, said cylinder having a second inlet port at one end and communicating with the enlargement, a controlling valve comprising a casing having an inlet port for connection with a source of fluid under pressure, and having outlet ports for connection with the inlet ports of the cylinder, and a valve in the casing having means for connecting the inlet port with either outlet port.

10. A vibrator, comprising a cylinder, a piston within the cylinder, said cylinder having an inlet port intermediate its ends, and having an enlargement at each end of the cylinder, the piston being ported to connect the inlet port to that end of the cylinder at which the piston is when the ports thereof are in register with the inlet port, said cylinder having a second inlet port at one end and communicating with the enlargement, and a controlling valve having means for connecting either inlet port with a source of fluid under pressure.

PETER J. JOECKEN.

Witnesses:
 GEO. W. ANGELL,
 JOSEPH H. FRICK.